(12) United States Patent
Loeb et al.

(10) Patent No.: US 10,304,145 B2
(45) Date of Patent: May 28, 2019

(54) SYSTEM AND METHOD TO DYNAMICALLY ALLOCATE ENERGY SAVINGS AMOUNTS FOR REMOTE ENERGY EFFICIENT LIGHT FIXTURE NETWORKS

(71) Applicants: Michael R. Loeb, New York, NY (US); Jason Slosberg, Montclair, NJ (US); Andrew Bein, Riverside, CT (US); Alvin Kopel, Westminster, CO (US); Edward J. McCabe, New York, NY (US); John F. Rovegno, Stamford, CT (US)

(72) Inventors: Michael R. Loeb, New York, NY (US); Jason Slosberg, Montclair, NJ (US); Andrew Bein, Riverside, CT (US); Alvin Kopel, Westminster, CO (US); Edward J. McCabe, New York, NY (US); John F. Rovegno, Stamford, CT (US)

(73) Assignee: LINKBEE, LLC, New York, NY (US)

( * ) Notice: Subject to any disclaimer, the term of this patent is extended or adjusted under 35 U.S.C. 154(b) by 606 days.

(21) Appl. No.: 14/713,257

(22) Filed: May 15, 2015

(65) Prior Publication Data
US 2016/0335730 A1 Nov. 17, 2016

(51) Int. Cl.
*G06Q 50/06* (2012.01)

(52) U.S. Cl.
CPC ............. *G06Q 50/06* (2013.01); *Y02P 80/10* (2015.11)

(58) Field of Classification Search
CPC ................................ G06Q 50/06; Y02P 80/10

USPC ......................................................... 705/412
See application file for complete search history.

(56) References Cited

U.S. PATENT DOCUMENTS

| | | | |
|---|---|---|---|
| 6,535,859 B1* | 3/2003 | Yablonowski | G06Q 30/0234 702/62 |
| 2003/0101062 A1* | 5/2003 | Taber, Jr. | G06Q 10/06 705/400 |
| 2011/0251933 A1* | 10/2011 | Egnor | G06Q 50/06 705/30 |

(Continued)

OTHER PUBLICATIONS

"On-Bill Financing: Zero-Interest Financing for Qualified Energy Efficiency Projects"; Southern California Edison; Fact Sheet; Accessed via Internet Archive Machine, Published Aug. 3, 2014; (Year: 2014).*

(Continued)

*Primary Examiner* — Kevin H Flynn
*Assistant Examiner* — Emmett K. Walsh
(74) *Attorney, Agent, or Firm* — Buckley, Maschoff & Talwalkar LLC

(57) ABSTRACT

According to some embodiments, data about a plurality of remote energy efficient light fixture networks may be received, and each energy efficient light fixture network is associated with a customer of an enterprise and includes a plurality of energy efficient light fixtures equipped with wireless communication devices. Based on data indicative of energy consumption by a first customer, a first energy savings amount may be determined for the first customer in connection with a pre-determined period of time. An allocation of the first energy savings amount between the first customer and the enterprise may be dynamically calculated and an indication of the allocation between the first customer and the enterprise may be transmitted.

18 Claims, 17 Drawing Sheets

(56) References Cited

U.S. PATENT DOCUMENTS

| | | | |
|---|---|---|---|
| 2011/0264563 A1* | 10/2011 | Lundberg | G06Q 30/02 705/27.2 |
| 2012/0233045 A1* | 9/2012 | Verfuerth | H05B 37/0272 705/34 |
| 2013/0204439 A1* | 8/2013 | Scelzi | G06Q 10/00 700/276 |
| 2015/0128283 A1* | 5/2015 | Mashima | G06F 21/60 726/26 |

OTHER PUBLICATIONS

Zobler, Neil, and Katy Hatcher. "Financing energy efficiency projects." Government Finance Review 19.1 (2003): 14-18. (Year: 2003).*

* cited by examiner

| CUSTOMER ID 1602 | STATUS 1604 | LIGHT FIXTURES 1606 | SAVINGS AMOUNT 1608 | ALLOCATED SAVINGS THIS QUARTER 1610 |
|---|---|---|---|---|
| C_101 | CURRENT | LF_101.1; LF_101.2 | $38.23 | $13.86 |
| C_102 | CURRENT | LF_102.1 | $15.06 | $5.10 |
| C_103 | CURRENT | LF_103.1; LF_103.2; LF_103.3; LF_103.4 | $28.58 | $9.37 |
| C_104 | TRIAL PERIOD | LF_104.1; LF_104.2 | $33.85 | $11.73 |

*FIG. 16*

| LIGHT FIXTURE ID 1702 | NETWORK 1704 | DESCRIPTION 1706 | REPORTED USAGE 1708 | STATUS 1710 |
|---|---|---|---|---|
| LF_101.1 | C_101 | SMITH CORPORATION (MODEL 123) | $1.49 | ON |
| LF_101.2 | C_101 | 60 WATT EQUIVALENT | 0 KWH | OFF |
| LF_102.1 | C_102 | INSTALLED 3/3/2019 | 1.5% | STANDBY |
| LF_103.1 | C_103 | SMITH CORPORATION (MODEL 125) | $0.06 | ON - DIM |

SYSTEM AND METHOD TO DYNAMICALLY ALLOCATE ENERGY SAVINGS AMOUNTS FOR REMOTE ENERGY EFFICIENT LIGHT FIXTURE NETWORKS

FIELD OF THE INVENTION

In general, the invention relates to a computerized system and method for allocating energy savings amounts associated with energy efficient light fixtures.

BACKGROUND OF THE INVENTION

Energy efficient light fixtures, such Light Emitting Diode ("LED") light fixtures, may consume less energy during use as compared to traditional incandescent bulbs, and use of the energy efficient light fixtures over time will result in an energy savings amount. In some cases, however, the energy efficient light fixtures may cost more to purchase or install as compared to less efficient lighting solutions. As a result, some customers may be unable or unwilling to use energy efficient light fixtures (even though the use of less efficient fixtures will eventually cost the customer more money in the long run).

SUMMARY

Therefore, there is a need in the art for ways to encourage the use of energy efficient light fixtures. Such measures may, according to some embodiments, receive data about a plurality of remote energy efficient light fixture networks, and each energy efficient light fixture network is associated with a customer of an enterprise and includes a plurality of energy efficient light fixtures equipped with wireless communication devices. Based on data indicative of energy consumption by a first customer, a first energy savings amount may be determined for the first customer in connection with a pre-determined period of time. An allocation of the first energy savings amount between the first customer and the enterprise may be dynamically calculated and an indication of the allocation between the first customer and the enterprise may be transmitted.

Some embodiments may be associated with: means for receiving data about a plurality of remote energy efficient light fixture networks, each energy efficient light fixture network being associated with a customer of an enterprise and including a plurality of energy efficient light fixtures equipped with wireless communication devices; means for storing data indicative of energy consumption by a first customer associated with a first energy efficient light fixture network; means for determining, based on the data indicative of energy consumption by the first customer, a first energy savings amount for the first customer in connection with a pre-determined period of time; means for dynamically calculating an allocation of the first energy savings amount between the first customer and the enterprise; and means for transmitting an indication of the allocation between the first customer and the enterprise.

According to another aspect, the invention relates to computerized methods for carrying out the functionalities described above. According to another aspect, the invention relates to non-transitory computer readable medium having stored therein instructions for causing a processor to carry out the functionalities described above.

BRIEF DESCRIPTION OF THE DRAWINGS

FIG. 16 is a tabular portion of a customer database in accordance with some embodiments.

FIG. 17 is a tabular portion of an enterprise database in accordance with some embodiments.

DESCRIPTION OF CERTAIN ILLUSTRATIVE EMBODIMENTS

To provide an overall understanding of the invention, certain illustrative embodiments will now be described, including systems and methods to facilitate use of energy efficient light fixtures. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
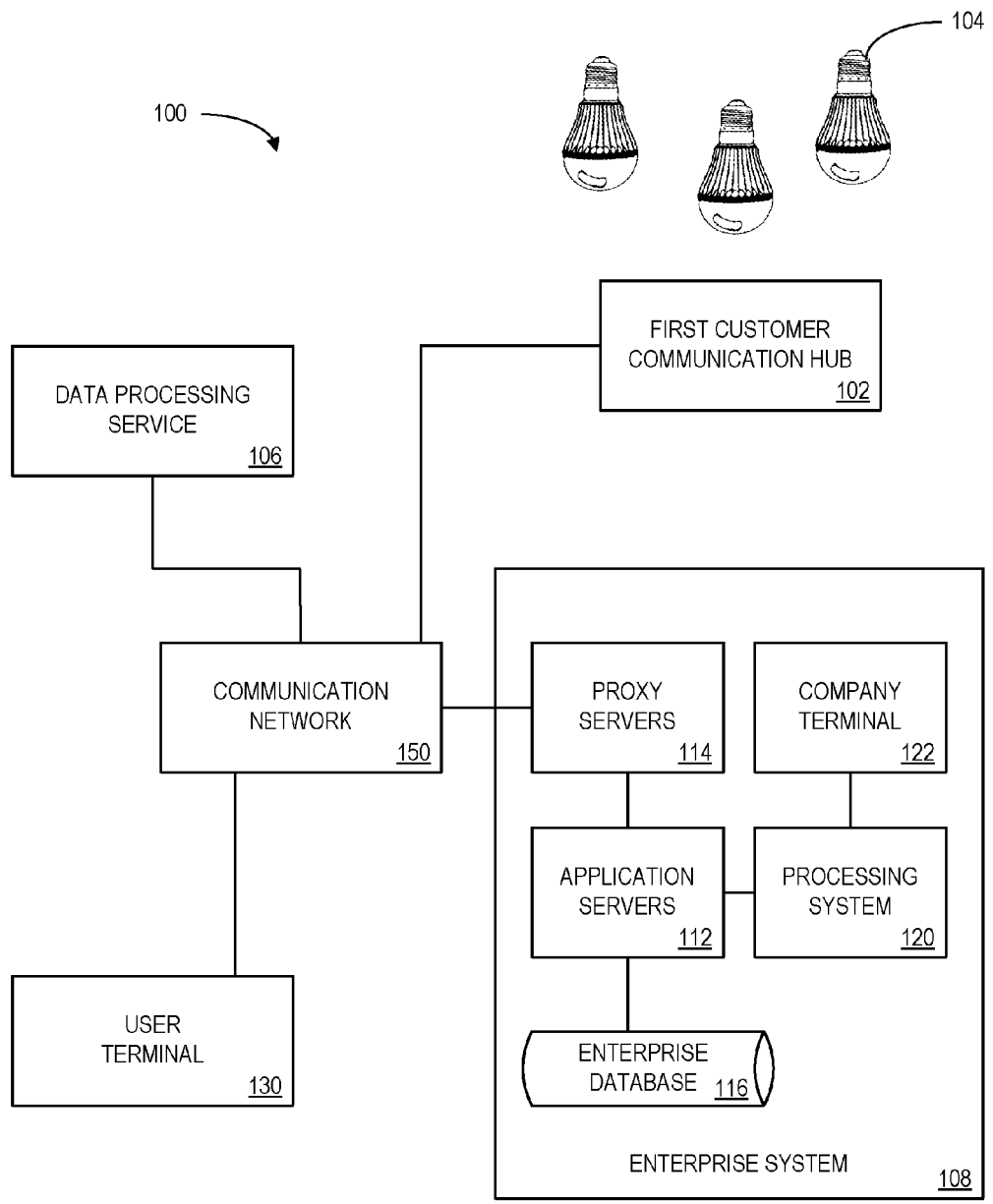
FIG. 1 is an architectural model of a system to facilitate use of energy efficient light fixtures according to an illustrative embodiment of the invention.

FIG. 1 is an architectural model of a system 100 to facilitate use of "energy efficient light fixtures" 104 according to an illustrative embodiment of the invention. As used herein, the term "energy efficient light fixtures" might refer to, for example, an LED light fixture or any other type or source of illumination. The system 100 may collect energy consumption data associated with operation of the energy efficient light fixtures 104. An enterprise may use the energy consumption data to allocate a savings amount between a customer and the enterprise. With a sufficient amount of data, the enterprise can calculate a predicted amount of usage or savings for the customer based on, for example, the customer's habits. The enterprise can use the savings amount for setting or adjusting a discount value to be applied to the customer. In some implementations, a score or discount is determined by the enterprise and/or a third party data processing service. In addition, the score or discount may be set by an automated process, which may be executed by the enterprise or otherwise affiliated with or in a third party arrangement with the enterprise. According to any embodiments described herein, a score might be used to determine a rebate, an energy company utility bill adjustment, and/or any other benefit that may be associated with a customer.

The system 100 includes a first customer communication hub 102 collecting data about the energy efficient light fixtures 104. Together, the first customer communication hub 102 and energy efficient light fixtures 104 may comprise a network remote from an enterprise. Note that the energy efficient light fixtures 104 might communicate with the communication hub 102 in any number of ways including wirelessly, via power lines, etc. The first customer communication hub 102 may be positioned inside a customer's home, attached to the outside of the home, and/or be integrated into one or more light fixtures. As used herein, the term "home" might refer to any type of dwelling, including a standalone house, an apartment building, a co-op unit, etc. The first customer communication hub 102 may be in communication with an enterprise system 108 over a communication network 150. The light fixtures 104 and/or the first customer communication hub 102 may communicate with the enterprise system 108 though a wireless network such as a cellular network or using a wireless Internet connection. In general, the first customer communication hub 102 can be any computing device or plurality of computing devices in cooperation having a data collection sensor (e.g., an antenna), a processor, a memory, and a means for transmitting the collected data. The light fixtures 104 may wirelessly transmit information about customer usage (e.g., when the fixtures 104 are turned on or are in standby mode) and/or an amount of actual energy usage. In one implementation, the first customer communication hub 102 is also configured to process the collected data. In some embodiments, the first customer communication hub 102 or other elements of the system 100 protect a customer's privacy by encrypting the data, removing personal information, producing summary information, and/or taking other measures to reduce the likelihood that sensitive information is received by the enterprise or third parties 224 (See FIG. 2).

In some embodiments, rather than sending collected data directly to the enterprise system 108, the first customer communication hub 102 sends collected data to a data processing service 106, which processes the data to determine a score and/or an appropriate discount for a customer that is then sent to the enterprise system 108. This can help protect a customer's privacy, since the enterprise does not get detailed data about a customer's usage, but only receives summary information. Using a data processing service 106 is in some implementations also preferable to having the first customer communication hub 102 process data to output an energy efficiency score because it reduces the processing power needed by first customer communication hub 102 and because using a third party data processing service 106 may also make it more difficult for customers to tamper with the data. The data processing service 106 can perform additional monitoring functions, such as functions associated with other types of sensors (e.g., home security sensors). Note that an enterprise might receive detailed reports from the third party data processing service 106, summary reports (with certain details removed), and/or supplemented information (e.g., including information from one or more public databases). According to some embodiments, a customer may access data via a user terminal 130 (e.g., the customer might view a current savings amount via a web page). Note that in some embodiments, a detailed record might be created recording all of the information associated with a large number of communication hubs 102, including the status of light fixtures, the number of people in various rooms, the movement of people between rooms, etc. According to some embodiments summaries of this large store of information may be generated (e.g., on a ZIP code level).

The enterprise system 108 includes a plurality of application servers 112, a plurality of load balancing proxy servers 114, an enterprise database 116, a processing system 120, and a company terminal 122. These computing devices are connected by a local area network.

The application servers 112 are responsible for interacting with the first customer communication hub 102 and/or the data processing service 106. The data exchanged between the enterprise system 108 and first customer communication hub 102 and/or data processing service 106 can utilize push and pull technologies where the application servers 112 of the enterprise system 108 can act as both a server and client for pushing data to the data processing service 106 (e.g., which light fixtures 104 to monitor, when to stop data collection, rules for monitoring services requested by the customer) and for pulling data from the data processing service 106. The application servers 112 or other servers of the enterprise system 108 can request to receive periodic data feeds from the first customer communication hub 102 and/or data processing service 106. The communication between the application servers 112 and the data processing service 106 can follow various known communication protocols, such as TCP/IP. Alternatively, the application servers 112 and data processing service 106 can communicate with each other wirelessly, e.g., via cellular communication, Wi-Fi, Wi-Max, or other wireless communications technologies or combination of wired or wireless channels. The load balancing proxy servers 114 operate to distribute the load among application servers 112.

The enterprise database 116 stores information about customer energy consumption. For each customer, the database 116 includes for example and without limitation, the following data fields: an identifier, a customer subsidy amount, a date of purchase, dates of subsequent renewals, product and price of product sold, applicable automation services (for example, electronic billing, automatic electronic funds transfers, centralized customer service plan selections, etc.), customer information, customer payment history, or derivations thereof.

The processing system 120 is configured for allocating an energy savings amount between a customer and the enterprise. The processing system 120 may comprise multiple separate processors, such as a scoring processor, which may calculates an energy efficiency rating from raw or processed data from the first customer communication hub 102 or data processing service 106 over the communications network 150; and a business logic processor, which determines an appropriate savings amount for a customer. An exemplary implementation of a computing device for use in the processing system 120 is discussed in greater detail in relation to FIG. 2.

The company terminals 122 provide various user interfaces to enterprise employees to interact with the processing system 120. The interfaces include, without limitation, interfaces to review energy usage data and/or scores; to retrieve data related to customer contracts; and/or to manually adjust an allocation amount. In some instances, different users may be given different access privileges. For example, marketing employees may only be able to retrieve information about customers but not make any changes to data. Such interfaces may be integrated into one or more websites for managing the enterprise system 108 presented by the application servers 112, or they may be integrated into thin or thick software clients or stand alone software. The company terminals 122 can be any computing devices suitable for carrying out the processes described above, including personal computers, laptop computers, tablet computers, smartphones, servers, and other computing devices.

The user terminal 130 provides various user interfaces to customers to interact with the enterprise system 108 over the communications network 150. Potential customers can use user terminals 130 to retrieve contract and pricing information for subsidies offered by the enterprise. Customers can enter information pertaining to energy usage and/or changes in their contract, e.g., an addition or subtraction of customer lighting fixtures 104, etc.

In some embodiments, the first customer communication hub 102 may not be continually connected to the enterprise system 108 via the network 150. For example, the first customer communication hub 102 may be configured to temporarily store data if the first customer communication hub 102 becomes disconnected from the network 150. When the connection is restored, the first customer communication hub 102 can then transmit the temporarily stored data to the enterprise system 108. The first customer communication hub 102 may alternatively be configured to connect to the communications network 150 through a user's home Wi-Fi network. In this case, the first customer communication hub 102 stores energy usage data until a pre-determined time, connects to the user's wireless network, and sends the data. In some embodiments, the first customer communications hub 102 is not connected to the network 150 at all, but rather, data collected is transmitted to the enterprise through other means. For example, a customer can receive a first customer communication hub 102 from the enterprise, couple the device 104 to his or her light fixtures 104, and then either mail the device 104 with the collected data to the enterprise system 108 or extract and send the collected data to the enterprise system 108 via mail, email, or through a website.

Thus, in some embodiments, the communication hub 102 may facilitate the collection and exchange of information associated with the system 100. In other embodiments, the light fixtures 104 themselves may form a computer "mesh network." As used herein, the phrase "mesh network" may refer to a network topology having a decentralized design in which each node on the network may connects to multiple other nodes. Moreover, some of the network nodes may "talk" directly to each other without requiring the assistance of an Internet connection (helping reduce the chance of a single point of failure). If one node can no longer operate, the remaining nodes may still communicate with each other, directly or through one or more intermediate nodes. Note that a mesh networks might use a full mesh topology or a partial mesh topology. Also note that one or more of the nodes may be selected as a "master node" (which can be replaced, such as when the master node fails for any reason). Further note that any of the embodiments described herein might be implemented utilizing cloud computing. For example the hub might upload data to the cloud and receive instructions back from an application executing within the cloud (and use those instructions, for example, to facilitate control of the lighting fixtures 104).

Although the element described with respect to FIG. 1 is a light fixture 104, note that similar systems may be associated with other residential appliances that may be located at and/or service the residence (e.g., water, heating, and/or cooling fixtures). Moreover, some embodiments might be associated with a vehicle, including an automobile, a boat, a snowmobile, and/or an airplane.

Figure 2:
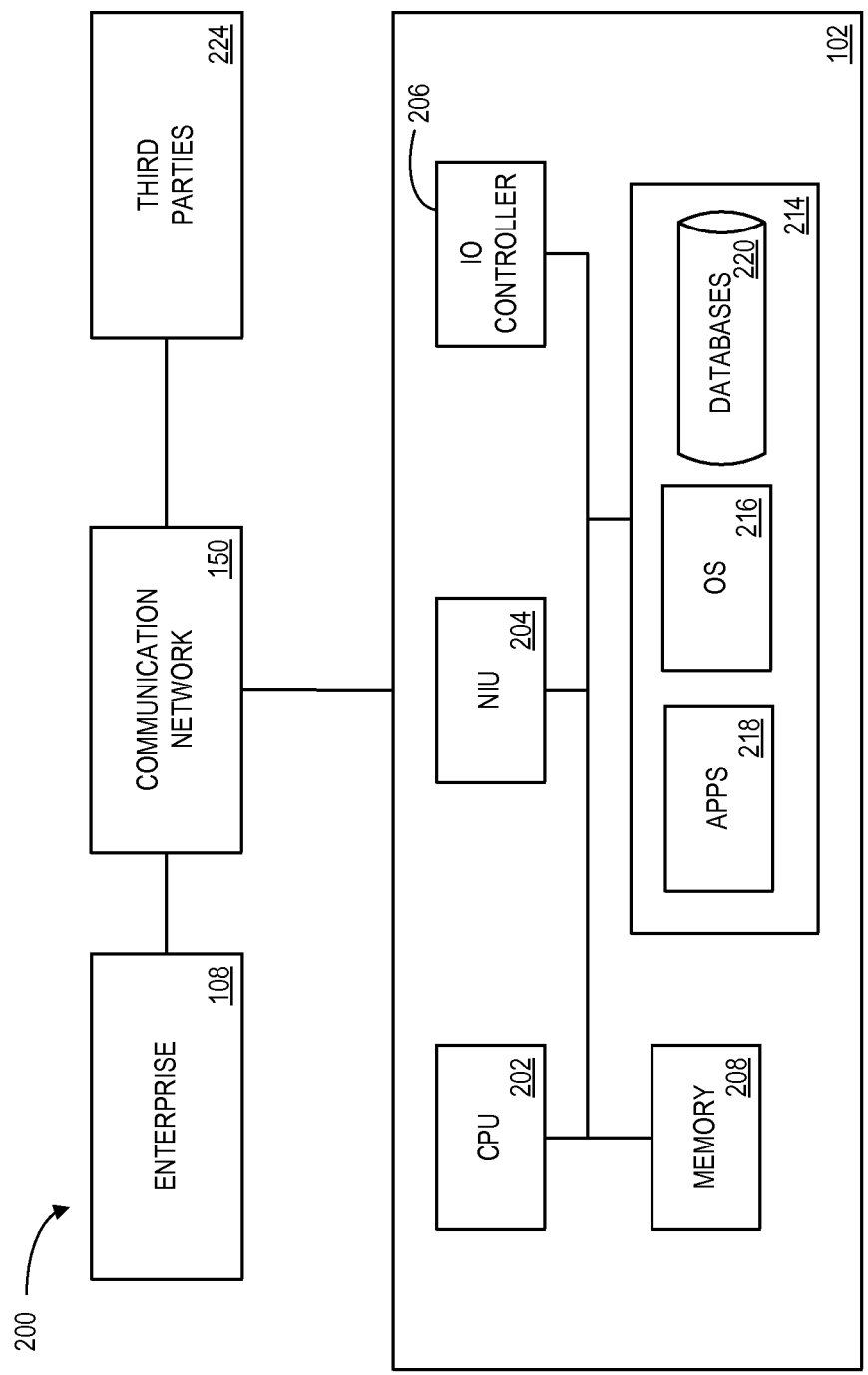
FIG. 2 is a block diagram of a computing system that may be associated with FIG. 1 according to an illustrative embodiment of the invention.

FIG. 2 is a block diagram of a computing device 200 that may be associated with the system 100 of FIG. 1 according to an illustrative embodiment of the invention. The computing device 200 comprises at least one Network Interface Unit ("NIU") 204, an Input Output ("IO") controller 206, a memory 208, and one or more data storage devices 214. The memory 208 may include at least one Random Access Memory ("RAM") and at least one Read-Only Memory ("ROM"). All of these elements are in communication with a Central Processing system ("CPU") 202 to facilitate the operation of the computing device 200. The computing device 200 may be configured in many different ways. For example, the computing device 200 may be a conventional standalone computer or alternatively, the functions of computing device 200 may be distributed across multiple computer systems and architectures. The computing device 200 may be configured to perform some or all of the energy consumption data collection and/or allocation calculations, or these functions may be distributed across multiple computer systems and architectures. In the embodiment shown in FIG. 2, the computing device 200 is linked, via network 150 or a local network, to other servers or systems housed by the enterprise system 108, such as the load balancing server and/or the application servers of FIG. 1.

The computing device 200 may be configured in a distributed architecture, wherein databases and processors are housed in separate units or locations. The computing device 200 may also be implemented as a server located either on site near the enterprise system 108, or it may be accessed remotely by the enterprise system 108. Some such units perform primary processing functions and contain at a minimum a general controller or the CPU 202 and the memory 208. In such an embodiment, each of these units is attached via the NIU 204 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 202 might comprise a processor, such as one or more conventional microprocessors and one or more supplementary co-processors such as math co-processors for offloading workload from the CPU 202. The CPU 202 is in communication with the NIU 204 and the IO controller 206, through which the CPU 202 communicates with other devices such as other servers, user terminals, or devices. The network NIU 204 and/or the IO controller 206 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 202 is also in communication with the data storage device 214. The data storage device 214 may comprise an appropriate combination of magnetic, optical and/or semiconductor memory, and may include, for example, RAM, ROM, flash drive, an optical disc such as a compact disc and/or a hard disk or drive. The CPU 202 and the data storage device 214 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 202 may be connected to the data storage device 214 via the network interface unit 204.

The CPU 202 may be configured to perform one or more particular processing functions. For example, the computing device 200 may be configured to collect energy consumption data and/or calculate allocations for a customer. The same computing device 200 or another similar computing device may be configured for calculating an energy efficiency score based on multiple factors. The same computing device 200 or another similar computing device may be configured for calculating an energy bill discount for a residence or customer based on these factors.

The data storage device 214 may store, for example, (i) an operating system 216 for the computing device 200; (ii) one or more applications 218 (e.g., computer program code and/or a computer program product) adapted to direct the CPU 202 in accordance with the present invention, and particularly in accordance with the processes described in detail with regard to the CPU 202; and/or (iii) database(s) 220 adapted to store information that may be utilized to store information required by the program. The database(s) 220 may including all or a subset of data stored in enterprise database 116, described above with respect to FIG. 1, as well as additional data, such as formulas or manual adjustments, used in establishing allocations.

The operating system 216 and/or applications 218 may be stored, for example, in a compressed, an uncompiled and/or an encrypted format, and may include computer program code. The instructions of the program may be read into a main memory of the processor from a computer-readable medium other than the data storage device 214, such as from the ROM 212 or from the RAM 210. While execution of sequences of instructions in the program causes the CPU 202 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing allocations based on energy consumption data for a light fixture or customer over a period of time. The program also may include program elements such as an operating system, a database management system and "device drivers" that allow the processor to interface with computer peripheral devices (e.g., a video display, a keyboard, a computer mouse, etc.) via the IO controller 206.

The term "computer-readable medium" as used herein refers to any non-transitory medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include Dynamic Random Access Memory ("DRAM"), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or Electronically Erasable Programmable Read-Only Memory ("EEPROM"), a FLASH-EEPROM, any other memory chip or cartridge, or any other non-transitory medium from which a computer can read.

Various forms of computer readable media may be involved in carrying one or more sequences of one or more instructions to the CPU 202 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 3:
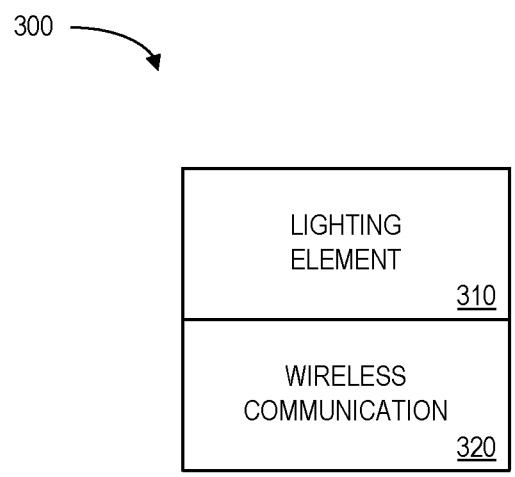
FIG. 3 is a block diagram of a light element and a device coupled to the lighting for providing data, according to an illustrative embodiment of the invention.

FIG. 3 is a block diagram of a light fixture 300 having a lighting element 310 and a wireless communication portion 320. The lighting element 310 might be associated with an LED unit or any other type energy efficient source of illumination. The wireless communication portion 320 may be co-located and/or located within the lighting element 410. According to some embodiments, the wireless communication portion 320 transmits data via a household electrical system and/or to the first customer communication hub 102 though a wireless connection, e.g., BLUETOOTH or Wi-Fi. Data obtained by the first customer communication hub 102 from the light fixture 300 may then be reported to the enterprise. In some embodiments, the wireless portion 320 turns on automatically when the light fixture 300 is turned on; moreover, the wireless communication portion 320 may be powered by the light fixture 300.

Figure 4:
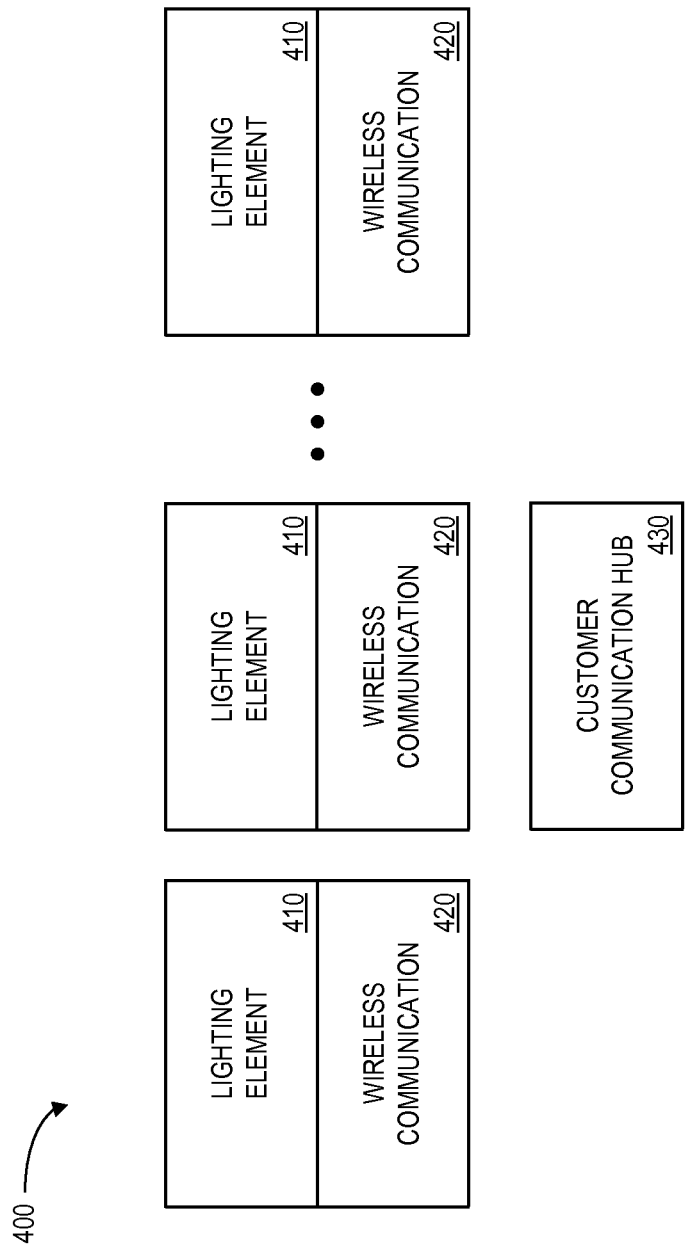
FIG. 4 illustrates an energy efficient light fixture network in accordance with some embodiment of the invention.

FIG. 4 is a block diagram of a network 400 having a number of light fixtures (each with a lighting element 410 and a wireless communication portion 420). The light elements 410 might be associated with an LED unit or any other type energy efficient source of illumination. The wireless communication portions 420 may be co-located and/or located within the lighting elements 410. According to some embodiments, all of the wireless communication portions 420 transmit data to a customer communication hub 430 though a wireless connection, e.g., BLUETOOTH or Wi-Fi. Data obtained by the customer communication hub 430 from the light fixtures may then be reported to the enterprise. The customer communication hub 430 may also include a wireless communications device for sending collected data, including data indicative of energy consumption and scoring and receiving commands from the data processing service 106 and/or enterprise system 108 via the network 150 of FIG. 1. The customer communication hub 430 may also be configured for communication with the customer or a resident via a user interface. The user interface might include output components, such as a screen or speakers, and input components, such as a touch screen, keyboard, or microphone. The user interface can output energy consumption data, route summary data, and/or an efficiency score.

Figure 5:
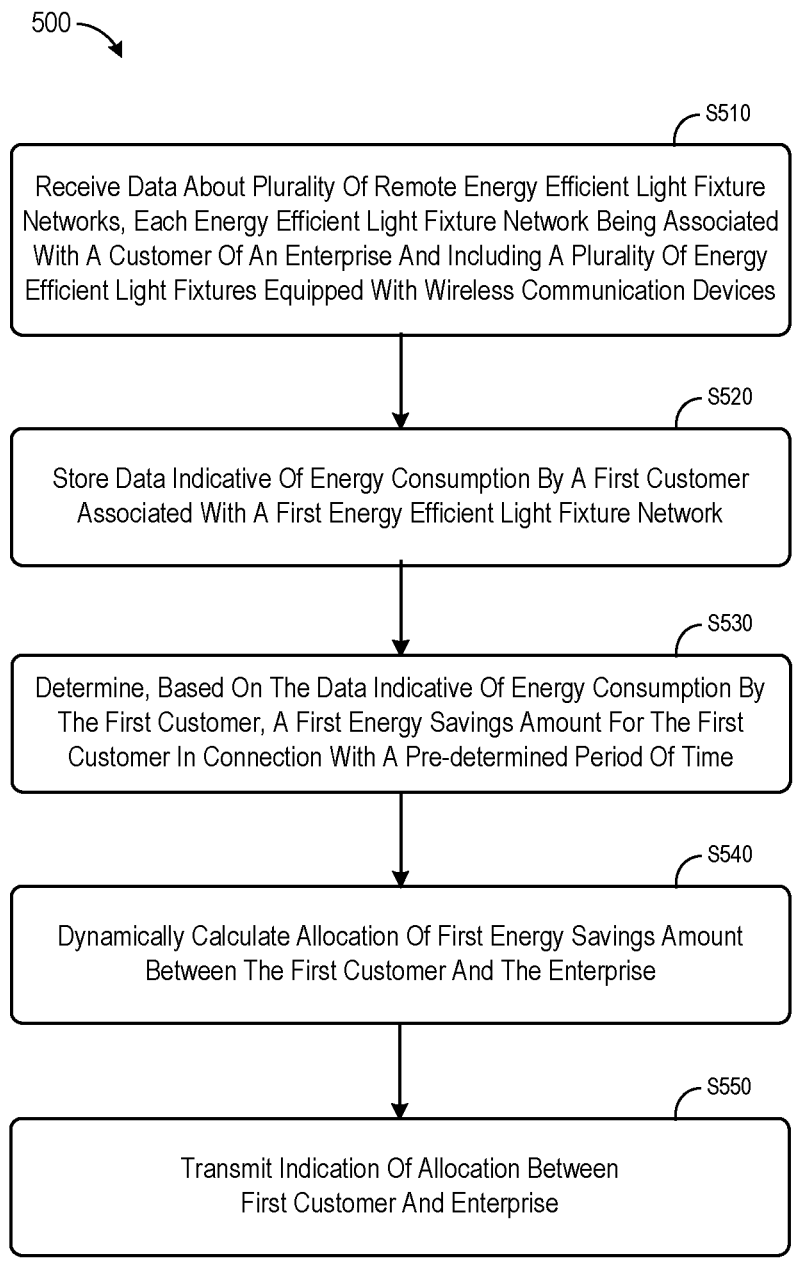
FIG. 5 is a flowchart of a method according to an illustrative embodiment of the invention.

FIG. 5 is a flowchart of a method 500 in accordance with some embodiments. The method 500 might be performed by the first customer communication hub 102, the data processing service 106, the enterprise system 108, or any combination of these. At S510, a communication port may receive data about a plurality of remote energy efficient light fixture networks, each energy efficient light fixture network being associated with a customer of an enterprise and including a plurality of energy efficient light fixtures equipped with wireless communication devices. According to some embodiments, the enterprise may have previously subsidized some or all of the purchase and/or instillation costs associated with these light fixtures on behalf of the customers. According to some embodiments, the communication port receives data about the first energy efficient light fixture network via a first customer communication hub co-located with the first energy efficient light fixture network.

At S520, data indicative of energy consumption by a first customer, associated with a first energy efficient light fixture network may be stored. For example, the data might indicate when least some of a set LED energy efficient light fixtures are turned on (or are in standby mode). At S530, the system may determine, based on the data indicative of energy consumption by the first customer, a first energy savings amount for the first customer in connection with a pre-determined period of time (e.g., on a weekly or monthly basis). For example, by using an LED fixture instead of an incandescent light bulb, the customer may have saved the first energy saving amount over the last year.

At S540, the system may dynamically calculate an allocation of the first energy savings amount between the first customer and the enterprise. That is, the enterprise may receive a portion of energy savings amount to help recover the cost of subsidizing the customer's initial purchase of the light fixtures. The dynamic calculation may be associated with, for example, allocating a pre-determined amount to the first customer or the enterprise and/or allocating a pre-determined percentage to the first customer or the enterprise.

At S550, an indication of the allocation between the first customer and the enterprise may be transmitted. For example, the indication of the allocation between the first customer and the enterprise might be transmitted to a first customer device, an enterprise device, an energy company device, and/or a payment platform. According to some embodiments, the system may also sensor information from the first energy efficient light fixture network, such as data generated by sensors to detect a level of light, motion, temperature, a presence of volatile organic compounds (e.g., smoke, CO, or $CO_2$), and/or data from other sensors.

Figure 6:
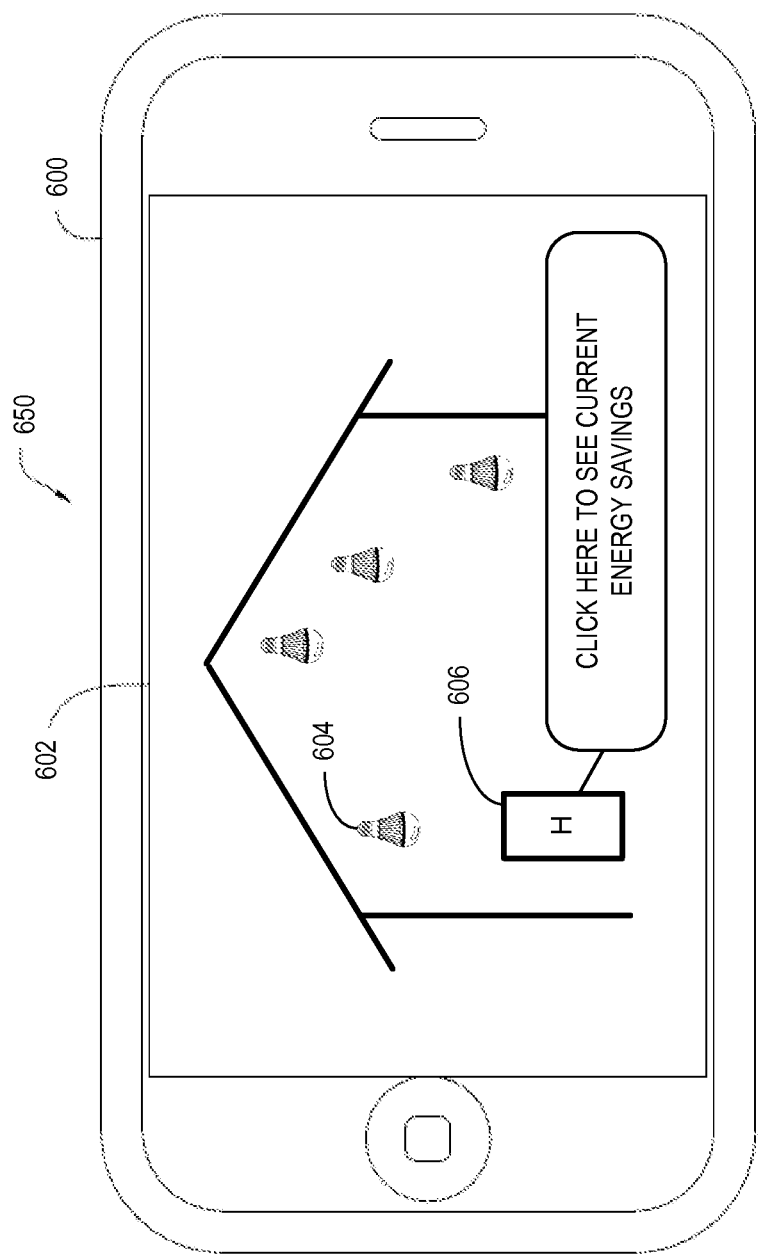
FIGS. 6 through 9 illustrate displays in accordance with some embodiments described herein.
Figure 7:
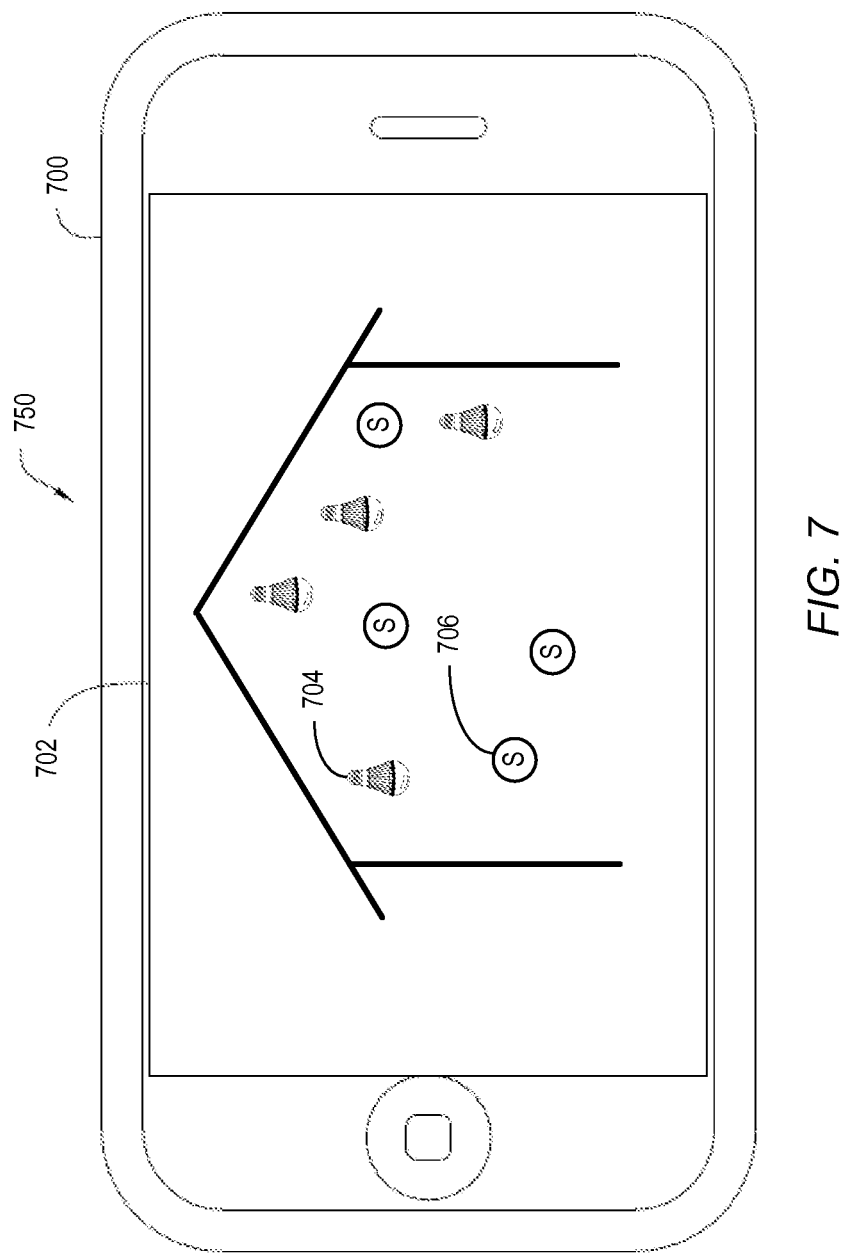

According to some embodiments, information about energy savings may be displayed to a customer on a display. For example, referring now to FIG. 6, a diagram 650 depicting a user interface 602 is shown. The user interface 602 may be displayed on device 600 such as a mobile telephone, PDA, personal computer, or the like. For example, the device 600 may be a PC, an iPhone® or smartwatch from Apple, Inc., a BlackBerry® from RIM, a mobile phone using the Google Android® operating system, or the like. The user interface 602 depicts a portion of a customer's home. The user interface 602 may display locations of energy efficient light fixtures 605 and/or a communication hub "H" 606. In this way, a customer may be able to quickly view the status of his or her network. According to some embodiments, selecting the H icon 606 results in detailed information about customer's current energy savings. As another example, referring now to FIG. 7, a diagram 750 depicting a user interface 702 is shown. The user interface 702 again may be displayed on device 700 and depicts the customer's house including light fixtures 704. In this embodiment, information about one or more sensors 706 also displayed. The user interface 702 may display sensor associated with other systems in the customer's home, such as an air conditioning system and/or heating system.

Figure 8:
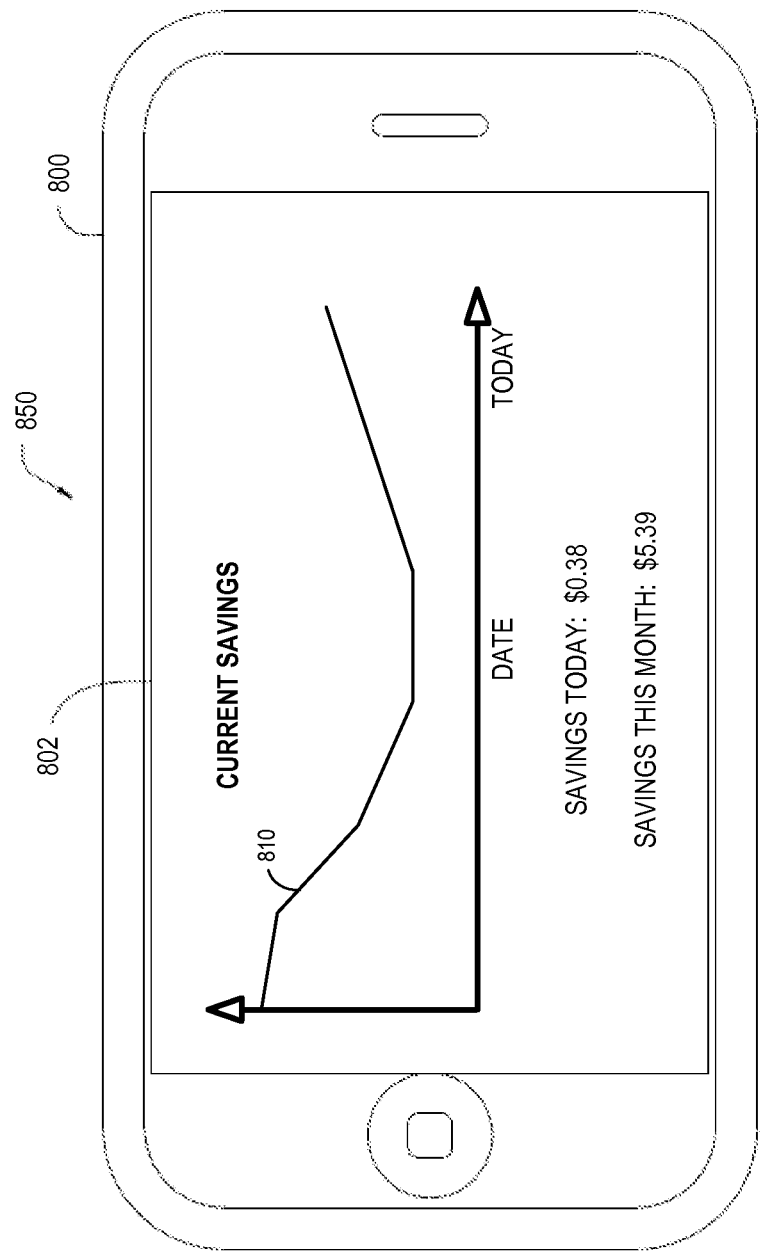

Note that a customer's energy saving may change over time. Thus, according to some embodiments a customer may interact with a display to view energy savings associated with a selected range of dates and/or times. For example, referring now to FIG. 8, a diagram 850 depicting another user interface 802 is shown. As before, the user interface 802 may be displayed on device 800 such as a mobile telephone. The user interface 802 may be display to a customer of an enterprise and might be graphically displayed 810 over time and/or include a total amount of savings (e.g., daily or monthly savings).

Figure 9:
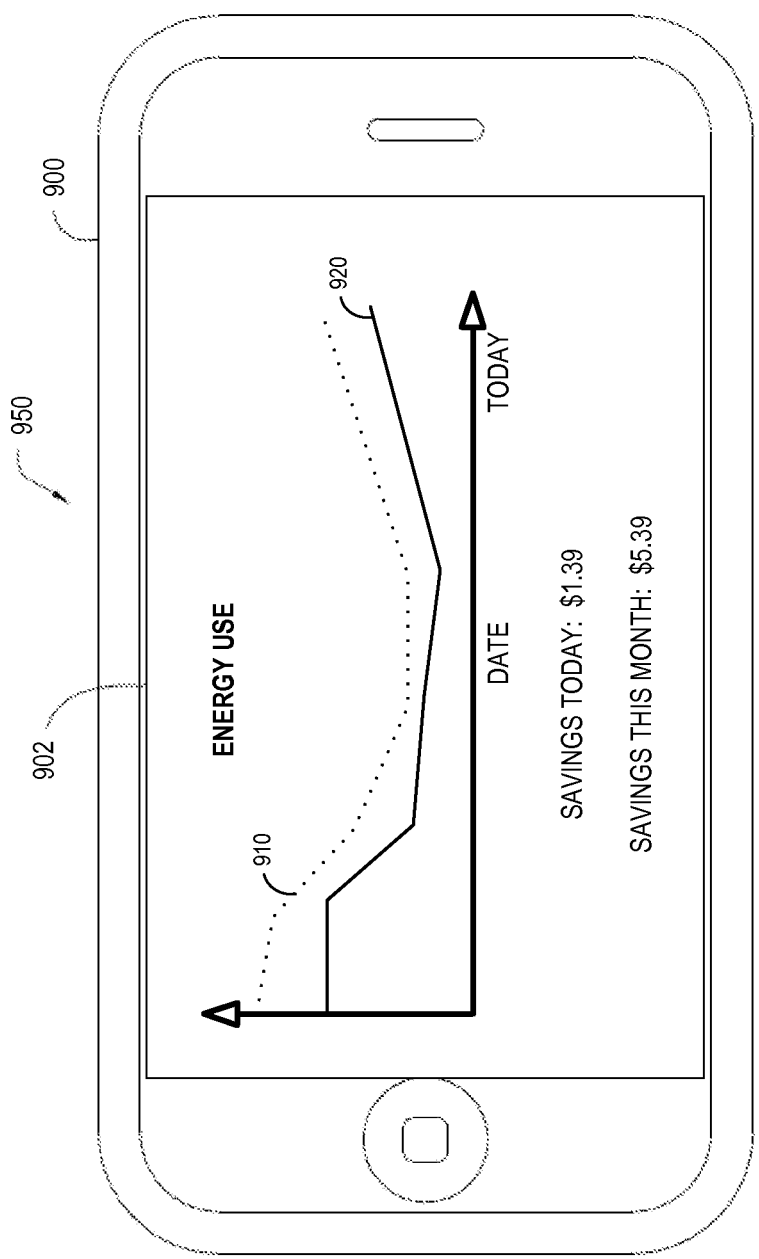

In some cases, a customer might be interested in and/or motivated by being informed of the relations between his or her actual energy use and what the energy use would have been without using his or her energy efficient light fixtures. For example, referring now to FIG. 9, a diagram 950 depicting a user interface 902 including a customer's energy use over a period of time. In particular, his or her actual energy use 920 may be displayed on device 900 and may be compared to that the energy consumption would have been 910 without the energy efficient light fixtures. In this way, a home customer may be encouraged to maintain and increase his or her use of energy efficient light fixtures.

Figure 10:
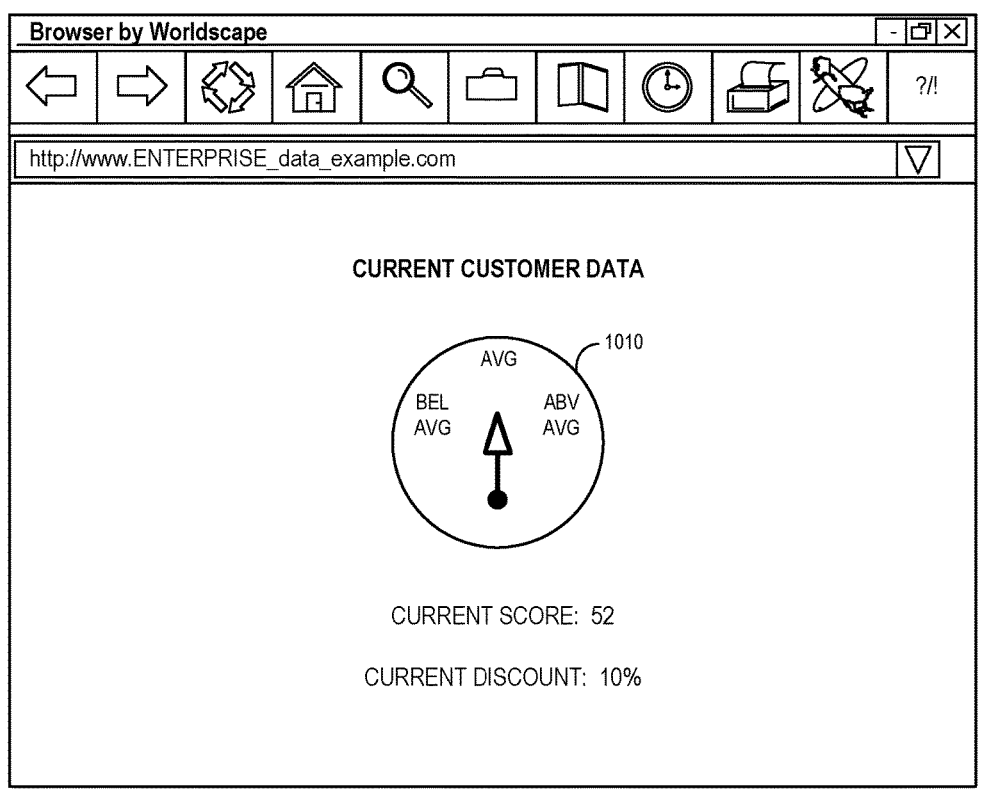
FIGS. 10 and 11 illustrate customer dashboard displays according to some embodiments.

According to some embodiments, a customer might be interested in his or her overall energy efficiency performance in connection with one or more types of light fixtures and/or how that performance compares to other customers, how that performance is modifying his or her current utility bill, etc. FIG. 10 illustrates a current customer data display 1000 according to some embodiments. In particular, the display 1000 includes a graphical dashboard representation 1010 of information about an energy efficiency score which may be categorized as "below average," "average," or "above average." The display 1100 also includes a current score (e.g., calculated at least in part based on information from light fixtures) and a current discount (e.g., determined based on the current score or in any other way). Note that the graphical representation 1010 might instead be a sliding scale, letter grade ("B+"), or any other type of indication.

Figure 11:
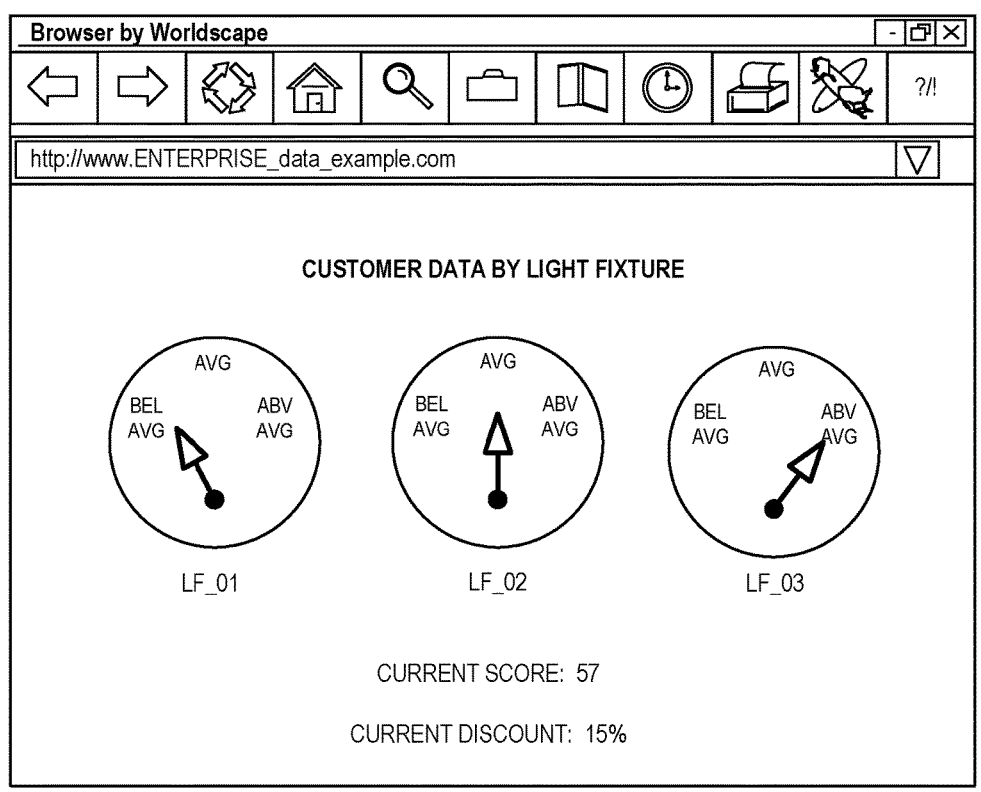

FIG. 11 illustrates another customer data display 1100 according to some embodiments. In particular, the display 1100 includes a graphical representation of information about three light fixtures (e.g., in the kitchen, living room, and bedroom), a current score (e.g., calculated based on data from those fixtures) and a current discount (e.g., determined based on the current score or in any other way). The current discount might, according to some embodiments, represent a final discount. According to some embodiments, the current discount might be calculated in substantially real time or be recalculated using new energy usage data at certain time periods, e.g., every month, every year, every two years, etc. In some embodiments, both prospective pricing and retroactive pricing are used. For example, a customer being continually monitored can be receive a premium discount for a time period based on past energy savings, and if the customer's actual score rating for a time period is greater than or less than the expected rating, an adjustment may be applied as appropriate.

Figure 12:
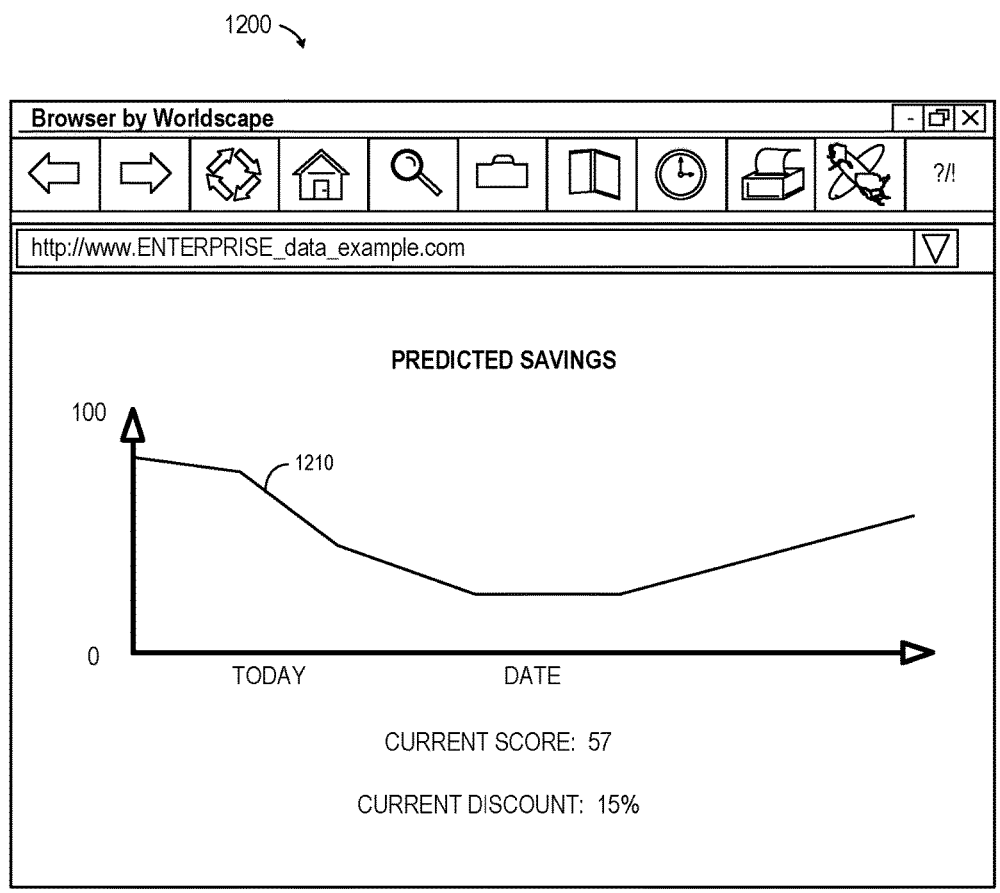
FIG. 12 illustrates a predicted savings display according to some embodiments.

Note that a customer's energy efficiency rating might change over time based on his or her habits, increased use of energy efficient light fixtures, etc. FIG. 12 is an example of a predicted savings display 1200 that might be provided to a customer according to some embodiments. In particular, the display 1200 includes a graph 1210 showing predicted savings over a particular period of time (e.g., over the next month or year). According to some embodiments, a customer may select the period of time depicted on the graph 1210. Such a predicted energy savings display 1200 might be created, for example, using historical data and/or a predictive model and may encourage the customer to improve his or her score and improve energy efficiency.

Figure 13:
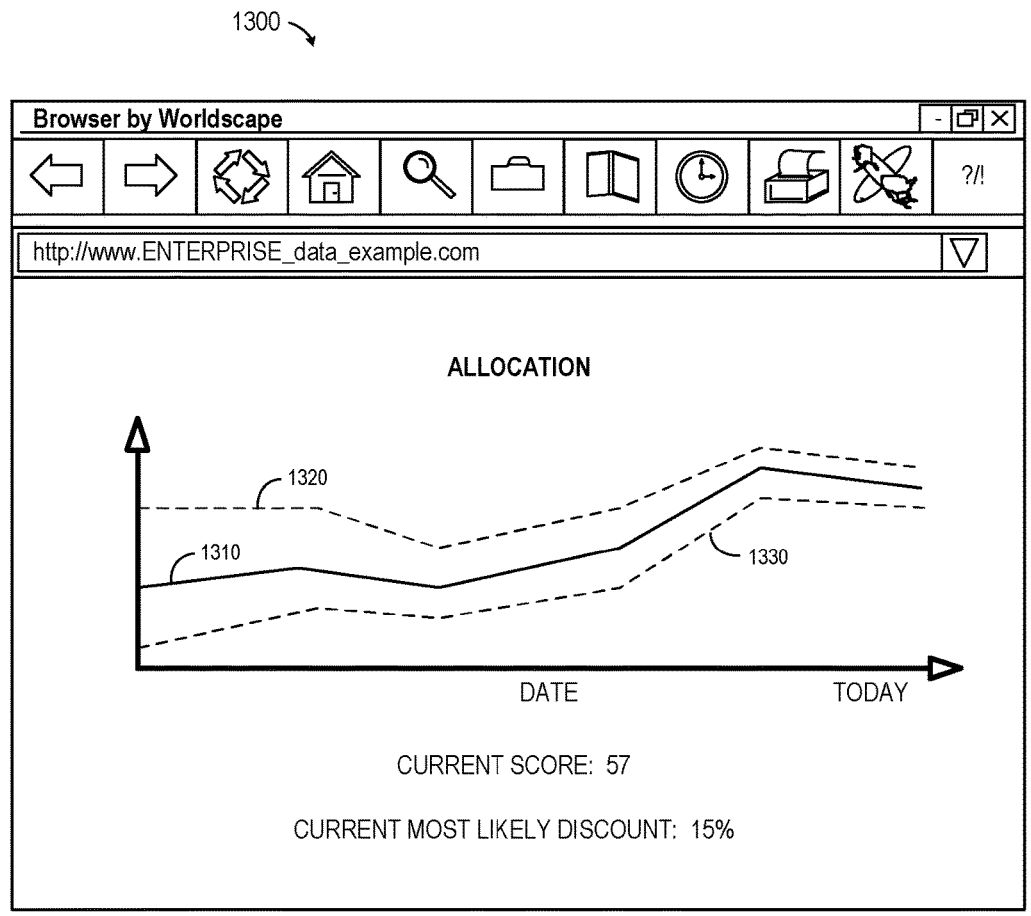
FIG. 13 illustrates an allocation display according to some embodiments.

The actual amount of savings created by the use of energy efficient light fixtures may be split between the customer and the enterprise (to help reimburse the enterprise, for example, in view of a subsidy pervious given to the customer). FIG. 13 illustrates an allocation display 1300 according to some embodiments. In particular, the display 1300 includes a line indicating an amount of energy that would have been used 1320 as compared to the amount that was actually consumed 1330 (because of the use of energy efficient light fixtures). That is, the savings is the area between those two lines 1320, 1330. Moreover, an allocation line 1310 divides that savings between the customer and the enterprise. For example, the area between lines 1310, 320 might be allocated to the customer while the area between line 1310, 1330 is allocated to the enterprise.

Figure 14:
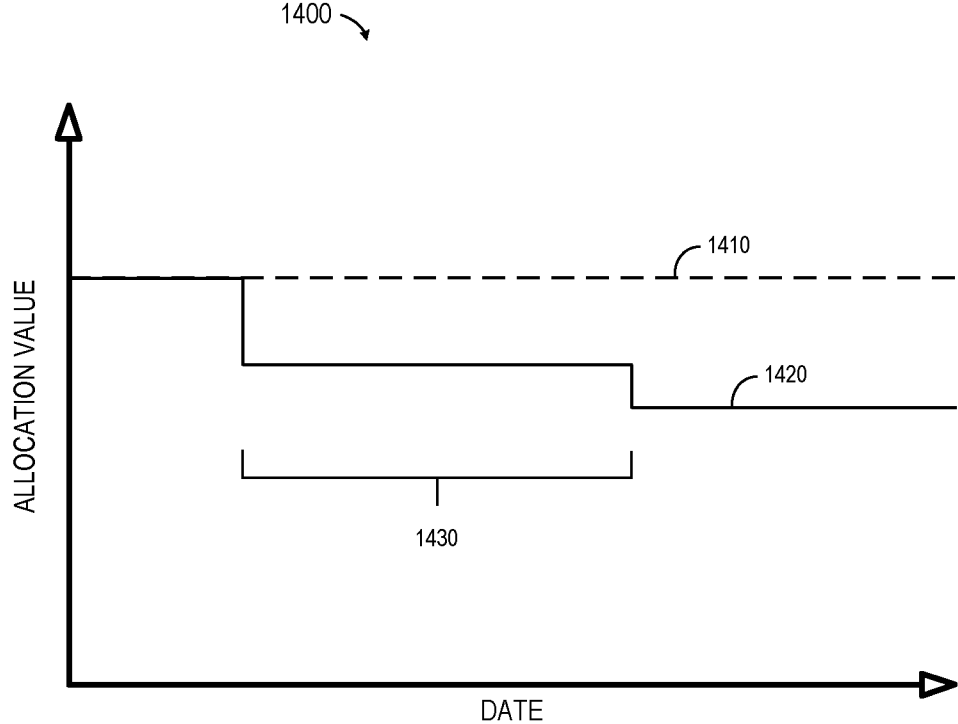
FIG. 14 illustrates how an allocation might change over time according to some embodiments.

FIG. 14 is an illustration 1400 of how an allocation or discount might change over time according to some embodiments. A baseline amount associated with what a customer would pay if he or she did not participate in an energy efficiency program is represented by a dashed line 1410 in FIG. 14 along with a solid line 1420 representing his or her actual amount. After the customer agrees to participate in the program, energy consumption data is collected during a pre-determined period of time 1430 (e.g., three months). During this time, the customer's electric bill is reduced by an initial discount amount. After the pre-determined period of time 1430, a final allocation is determined and applied to his or her electric (and the final amount might be more or less than the initial discount depending on his or her habits).

Figure 15:
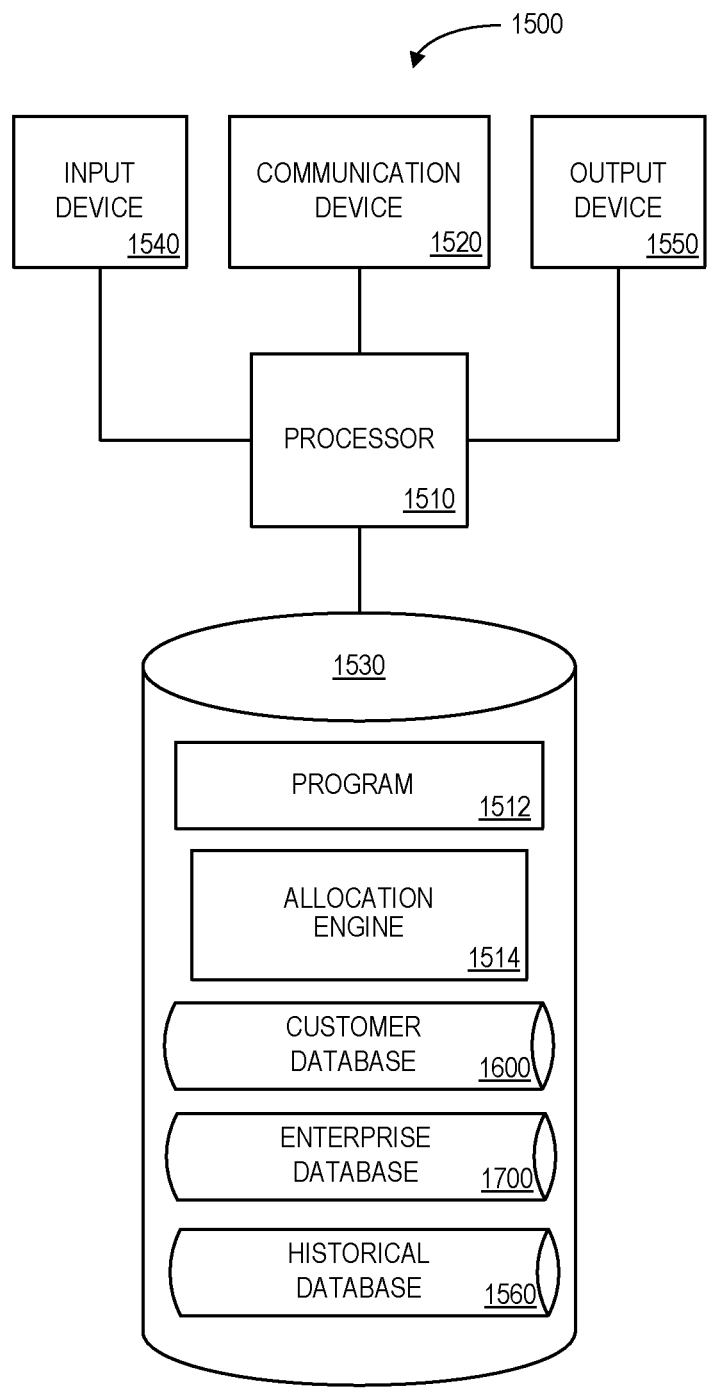
FIG. 15 is a block diagram of an enterprise platform provided in accordance with some embodiments.

The processes described herein may be performed by any suitable device or apparatus. FIG. 15 is one example of an enterprise platform 1500 according to some embodiments. The enterprise platform 1500 may be, for example, associated with the system 108 of FIG. 1. The enterprise platform 1500 comprises a processor 1510, such as one or more commercially available CPUs in the form of one-chip microprocessors, coupled to a communication device 1520 configured to communicate via a communication network (not shown in FIG. 15). The communication device 1520 may be used to communicate, for example, with one or more remote customer communication hubs or third party services. The enterprise platform 1500 further includes an input device 1540 (e.g., a mouse and/or keyboard to enter allocations formulas) and an output device 1550 (e.g., a computer monitor to display aggregated energy efficiency reports and/or results to an administrator).

The processor 1510 also communicates with a storage device 1530. The storage device 1530 may comprise any appropriate information storage device, including combinations of magnetic storage devices (e.g., a hard disk drive), optical storage devices, and/or semiconductor memory devices. The storage device 1530 stores a program 1512 and/or allocation engine 1514 for controlling the processor 1510. The processor 1510 performs instructions of the programs 1512, 1514, and thereby operates in accordance with any of the embodiments described herein. For example, the processor 1510 may receive data about a plurality of remote energy efficient light fixture networks, and each energy efficient light fixture network is associated with a customer of an enterprise and includes a plurality of energy efficient light fixtures equipped with wireless communication devices. Based on data indicative of energy consumption by a first customer, a first energy savings amount may be determined by the processor 1510 for the first customer in connection with a pre-determined period of time. An allocation of the first energy savings amount between the first customer and the enterprise may be dynamically calculated by the processor 1510 and an indication of the allocation between the first customer and the enterprise may be transmitted.

Referring again to FIG. 15, the programs 1512, 1514 may be stored in a compressed, uncompiled and/or encrypted format. The programs 1512, 1514 may furthermore include other program elements, such as an operating system, a database management system, and/or device customers used by the processor 1510 to interface with peripheral devices.

As used herein, information may be "received" by or "transmitted" to, for example: (i) the enterprise platform 1500 from another device; or (ii) a software application or module within the enterprise platform 1500 from another software application, module, or any other source.

In some embodiments (such as shown in FIG. 15), the storage device 1530 stores a customer database 1600, an enterprise database, 1700, and/or a historical database 1560. An example of databases that may be used in connection with the enterprise platform 1500 will now be described in detail with respect to FIGS. 16 and 17. Note that the databases described herein are only examples, and additional and/or different information may be stored therein. Moreover, various databases might be split or combined in accordance with any of the embodiments described herein.

Referring to FIG. 16, a table is shown that represents the customer database 1600 that may be stored at the enterprise platform 1500 according to some embodiments. The table may include, for example, entries identifying customers. The table may also define fields 1602, 1604, 1606, 1608, 1610 for each of the entries. The fields 1602, 1604, 1606, 1608, 1610 may, according to some embodiments, specify: a customer identifier 1602, a status 1604, light fixtures 1606, a savings amount 1608, and an allocation 1610. The information in the customer database 1600 may be created and updated, for example, based on information received from communication hubs.

The customer identifier 1602 may be, for example, a unique alphanumeric code identifying a customer or potential customer (e.g., a person or business). The status 1604 might indicate if the customer is, for example, current a customer, is in a trial period, etc. The light fixtures 1606 might indicate the actual energy efficient light fixtures that are installed in his or her network. The savings amount 1608 might indicate a reduced amount of cost due to use of those light fixtures 1606 over a pre-determined period of time. The allocation 1610 might indicate how much of that savings amount 1608 is allocated to the customer (with remaining amount being allocated to the enterprise).

Referring to FIG. 17, a table is shown that represents the enterprise database 1700 that may be stored at the enterprise platform 1500 according to some embodiments. The table may include, for example, entries identifying light fixtures. The table may also define fields 1702, 1704, 1706, 1708, 1710 for each of the entries. The fields 1702, 1704, 1706, 1708, 1710 may, according to some embodiments, specify: a light fixture identifier 1702, a network 1704, a description 1706, reported usage 1708, and a status 1710. The information in the enterprise database 1700 may be created and updated, for example, based on information received from customer communication hubs.

The light fixture identifier 1702 may be, for example, a unique alphanumeric code identifying an energy efficient light fixture and may be based on, or associated with, the light fixtures 1606 in the customer database 1600. The network 1704 might be, for example, a network identifier, communication address, or any other information that can associated with the light fixture with a remote customer network. The description 1706 might, for example, indicate entity manufacturer that produced the light fixture or any other information associated with the light fixture. The reported usage 1708 might, for example, by a monetary amount, a number of kilo Watt hours ("kWh"), a percentage (e.g., a percentage above or below a predicted or prior usage), etc. associated with the light fixture's energy consumption. The status 1710 might indicate, for example, whether the light fixture is currently on, off, in standby mode, dimmed, etc. As used herein, the phrase "standby mode" might indicate, for example, that a lighting element is off and the fixture is "listening" for further instructions. The information in the enterprise database 1700 may, for example, be used to calculate the savings amount 1608 and/or allocation 1610 in the customer database.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). Moreover, note that some or all of the embodiments described herein might collect, analyze, and/or display information about energy usage in substantially real time. For example, energy usage might be analyzed on a daily basis (e.g., by comparing current usage to other situations at a similar time of day, with a similar number of people in a house for a similar length of time). As a result of this analysis, adjustments might be automatically applied to one or more energy efficient light fixtures (e.g., to help ensure that an overall energy usage goal can be met). Similar adjustments might be made on an hourly, weekly, or any other basis.

Note that although simple energy calculation have been described herein for clarity, actual calculations may be more complicated and take into consideration any number of factors, including state and/or federal regulations. Note, for example, that electricity demand varies, and when it peaks—usually in the afternoon or evening each day, but also seasonally, such as on very hot days—the price of energy may increase. In some cases, governmental regulations require that individuals be compensated for voluntarily reducing power usage during peak demand. Any of the embodiments described herein may take such price changes and/or compensation into account.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system to facilitate use of energy efficient light fixtures, the system comprising:
    a plurality of remote energy efficient light fixture networks, each energy efficient light fixture network being associated with a customer of an enterprise system and including a customer communication hub and a plurality of energy efficient light fixtures, wherein each energy efficient light fixture is equipped with a wireless communication device configured for communications with the customer communication hub;
    a communication network configured to receive data from each customer communication hub associated with the plurality of remote energy efficient light fixture networks;
a third party data processing service configured to receive data via the communication network from each customer communication hub associated with the plurality of remote energy efficient light fixture networks and to determine a score for each customer;
    a plurality of customer mobile telephones configured for receiving data; and
    an enterprise system configured for communicating with the communication network and comprising an enterprise database and a processor in communication with the enterprise database, wherein the processor is configured to:
        receive, via the communications network from the third party data processing service, a score of a first customer associated with a first energy efficient light fixture network of the plurality of energy efficient light fixture networks, the score indicative of energy consumption by the first customer,
        determine, based on the score of the first customer associated with the first energy efficient light fixture network, a first energy savings amount for the first customer in connection with a pre-determined period of time,
        dynamically calculate an allocation of the first energy savings amount between the first customer and the enterprise system, and
        transmit an indication of the allocation between the first customer and the enterprise system to a first customer mobile telephone via the communication network.

2. The system of claim 1, wherein at least some of the energy efficient light fixtures are light emitting diode light fixtures.

3. The system of claim 1, wherein the dynamic calculation is associated with at least one of: (i) allocating a pre-determined amount to the first customer or the enterprise system, and (ii) allocating a pre-determined percentage to the first customer or the enterprise system.

4. The system of claim 1, wherein at least some of the energy efficient light fixtures are further equipped with a sensor, and the processor is further configured to:
    collect sensor information from the first energy efficient light fixture network.

5. The system of claim 4, wherein the sensor is to detect: (i) a level of light, (ii) motion, (iii) temperature, (iv) a presence of volatile organic compounds, or (v) data from another sensor.

6. The system of claim 1, wherein the indication of the allocation between the first customer and the enterprise system is also transmitted to at least one of an enterprise device, an energy company device, and a payment platform.

7. A computerized method to facilitate use of energy efficient light fixtures, the method comprising:
- receiving, by an enterprise system via a communication network from a third party data processing service, a score of a first customer associated with a first energy efficient light fixture network of a plurality of energy efficient light fixture networks, each energy efficient light fixture network being associated with a customer of the enterprise system and including a plurality of energy efficient light fixtures equipped with wireless communication devices, wherein the score is indicative of energy consumption;
- determining, by the enterprise system based on the score of the first customer associated with the first energy efficient light fixture network, a first energy savings amount for the first customer in connection with a pre-determined period of time;
- dynamically calculating, by the enterprise system, an allocation of the first energy savings amount between the first customer and the enterprise system; and
- transmitting, by the enterprise system via the communication network to a first customer mobile telephone, an indication of the allocation between the first customer and the enterprise system.

8. The method of claim 7, wherein at least some of the energy efficient light fixtures are light emitting diode light fixtures.

9. The method of claim 7, wherein the dynamic calculation is associated with at least one of: (i) allocating a pre-determined amount to the first customer or the enterprise system, and (ii) allocating a pre-determined percentage to the first customer or the enterprise system.

10. The method of claim 7, wherein at least some of the energy efficient light fixtures are further equipped with a sensor, and further comprising collecting sensor information from the first energy efficient light fixture network.

11. The method of claim 10, wherein the sensor is to detect: (i) a level of light, (ii) motion, (iii) temperature, (iv) a presence of volatile organic compounds, or (v) data from another sensor.

12. The method of claim 7, wherein the indication of the allocation between the first customer and the enterprise is also transmitted to at least one of an enterprise device, an energy company device, and a payment platform.

13. A non-transitory, computer readable medium having stored therein instructions that, upon execution, cause a computer of an enterprise system to perform a method to facilitate use of energy efficient light fixtures, the method comprising:
- receiving, from a third party data processing service, a score of a first customer indicative of energy consumption associated with a first energy efficient light fixture network of a plurality of remote energy efficient light fixture networks, each energy efficient light fixture network being associated with a customer of an enterprise system and including a plurality of energy efficient light fixtures equipped with wireless communication devices;
- determining, based on the score of the first customer associated with the first energy efficient light fixture network, a first energy savings amount for the first customer in connection with a pre-determined period of time;
- dynamically calculating an allocation of the first energy savings amount between the first customer and the enterprise system; and
- transmitting an indication of the allocation between the first customer and the enterprise system to a first customer mobile telephone.

14. The medium of claim 13, wherein at least some of the energy efficient light fixtures are light emitting diode light fixtures.

15. The medium of claim 13, wherein the dynamic calculation is associated with at least one of: (i) allocating a pre-determined amount to the first customer or the enterprise system, and (ii) allocating a pre-determined percentage to the first customer or the enterprise system.

16. The medium of claim 13, wherein at least some of the energy efficient light fixtures are further equipped with a sensor, and comprising further instructions that, upon execution, cause the computer to:
- collect sensor information from the first energy efficient light fixture network.

17. The medium of claim 16, wherein the sensor is to detect: (i) a level of light, (ii) motion, (iii) temperature, (iv) a presence of volatile organic compounds, or (v) data from another sensor.

18. The medium of claim 13, wherein the indication of the allocation between the first customer and the enterprise system is also transmitted to at least one of an enterprise device, an energy company device, and a payment platform.

* * * * *